(12) United States Patent
Harrison et al.

(10) Patent No.: US 8,296,094 B2
(45) Date of Patent: Oct. 23, 2012

(54) ANALYSIS OF PARALLEL MANIPULATORS

(75) Inventors: Andrew Joseph Lawrence Harrison, Bristol (GB); Arkadijus Nikonovas, Cologne (DE)

(73) Assignee: Smith & Nephew, Inc., Memphis, TN (US)

( * ) Notice: Subject to any disclaimer, the term of this patent is extended or adjusted under 35 U.S.C. 154(b) by 398 days.

(21) Appl. No.: 12/594,390

(22) PCT Filed: Apr. 2, 2008

(86) PCT No.: PCT/GB2008/001157
§ 371 (c)(1),
(2), (4) Date: Apr. 8, 2010

(87) PCT Pub. No.: WO2008/122760
PCT Pub. Date: Oct. 16, 2008

(65) Prior Publication Data
US 2010/0191500 A1 Jul. 29, 2010

(30) Foreign Application Priority Data
Apr. 4, 2007 (GB) .................................. 0706663.2

(51) Int. Cl.
*G01C 9/00* (2006.01)
(52) U.S. Cl. ....................................................... 702/150
(58) Field of Classification Search .................. 702/150, 702/182–185
See application file for complete search history.

(56) References Cited

U.S. PATENT DOCUMENTS
5,728,095 A 3/1998 Taylor et al.
6,587,802 B1 * 7/2003 Schroder et al. ................ 702/91

2007/0146371 A1 * 6/2007 Dariush ........................ 345/474

FOREIGN PATENT DOCUMENTS
WO WO9928095 6/1999

OTHER PUBLICATIONS

Durali, et al., "Full order neural velocity and acceleration observer for a general 6-6 stewart platform," *Networking, Sensing and Control*, 2004 IEEE International Conference on Taipei, Taiwan, Mar. 21-24, 2004, pp. 333-338, vol. 1, XP010706123.
Parikh and Lam, "A Hybrid Strategy to Solve the Forward Kinematics Problem in Parallel Manipulators," *IEEE Transations on Robotics*, IEEE Service Center, Piscataway, NJ, pp. 18-25, vol. 21, No. 1, (2005).
Lu Ren, et al., "A Self-Tuning Iterative Calculation Approach for the Forward Kinematics of a Stewart-Gough Platform," *Mechatronics and Automation*, Proceedings of the 2006 IEEE International Conference on, IEEE, pp. 2018-2023 (2006) XP031027093.

* cited by examiner

*Primary Examiner* — Edward Raymond
(74) *Attorney, Agent, or Firm* — Fish & Richardson P.C.

(57) ABSTRACT

A method of determining the positions and orientations of the base (8) and platform (10) of a parallel manipulator using an iterative calculation in which successive iterations calculate estimates of said positions and orientations, each estimate being determined from the previous estimate using an inverse of a derivative of an error function (F), that function also being used to determine error values for each estimate, wherein if the error values are deemed unacceptable a new derivative is calculated and the iteration is repeated, whereas if the error values are deemed acceptable the same derivative is used in a subsequent iteration. Thus the derivative need not be re-calculate for each iteration, whereby the process can operate more rapidly, e.g. in real time.

7 Claims, 2 Drawing Sheets

ANALYSIS OF PARALLEL MANIPULATORS

CROSS REFERNCE TO RELATED APPLICATIONS

This application is the U.S. national phase of International Application No. PCT/GB2008/001157 filed on Apr. 2, 2008 and published in English on Oct. 16, 2008 as International Publication No. WO 2008/122760 A1, which application claims priority to Great Britain Application No. 0706663.2 filed on Apr. 4, 2007, the entire contents of both of which are incorporated herein by reference.

TECHNICAL FIELD

The present invention relates to the analysis of parallel manipulators. In particular but not exclusively, the present invention relates to the analysis of the position and orientation of hexapods, such as a Taylor Spatial Frame (TSF) or a Generalised Stewart platform (GSP).

BACKGROUND TO THE INVENTION

A parallel manipulator is a device having a base and a platform interconnected by at least three independent connections each of which is variable in length and is mounted to the base and platform, in a way in which provides six degrees of freedom. In a hexapod there are six independent connections pivotally mounted to the base and platform. Thus, by varying the relative lengths of the connections, the orientation and position of the platform relative to the base may be varied. A Stewart platform, whose six degrees of freedom can be exercised by varying the length of the actuators, is known as a Generalised Stewart Platform (GSP), and sometimes as a Stewart-Gough Platform. Examples of such GSPs are disclosed in U.S. Pat. No. 5,728,095 and WO 99/28095. In those examples, the base and platform are linked by six actuators. Moreover, since the base and platform may be symmetric, it becomes a matter of choice as to which is which, the base being the component from which the position and orientation of the platform is determined. The base and platform can be of any geometry.

The GSP has been put into effect in the form of the Taylor Spatial Frame (TSF), to act as an orthopaedic fixator. It is a parallel manipulator with a full set of six degrees of correctional freedom; this is illustrated in detail in e.g. U.S. Pat. No. 5,728,095 referred to above. In such a Taylor Spatial Frame, the links are in the form of actuators, which are inclined to the perpendicular between the base and the platform, with adjacent actuators inclined in opposite directions so as to form an approximately cylindrical structure.

It is a relatively straightforward matter to determine the length of the connections that are needed when the locations and orientations of the base and platform are known, but it is amore difficult problem to determine the position and orientation of the platform given the lengths of the links. Since it is the links that are controllable in length, e.g. because they are actuators controlled by an operator, a user of a Taylor Spatial Frame must have a way of determining the platform position and orientation given control actions, or given variations in the lengths of the links. For a given set of link lengths, equations can be set up to enable the position of the platform to be determined relative to the base, but such equations are not easy to solve. In practice, numerical methods, based on iterative schemes, have been found to be more useful than attempts to find the solution by algebraic methods. Algebraic methods may lead to all known solutions, but for practical control operations only one solution is needed.

However, known numerical methods for determining the position of the platform relative to the base have tended to involve long processing times, making their use for practical applications, such as in orthopaedics, inappropriate. For such arrangements, a substantially real-time solution is needed, and known arrangements have not been able to provide this.

SUMMARY OF THE INVENTION

At its most general, the present invention proposes an iterative scheme in which successive attempts are made to determine a solution based on estimates of the solution, each estimate being derived from the previous estimate using an inverse of a derivative of an error function. Error values are then determined for each estimate and the iteration repeated if the properties of the error values are unacceptable. However, in the present invention, the inverse of the derivative is not re-calculated every iteration. Instead, if the error values are such that their properties are acceptable, the same derivative, and hence the same inverse is used in the subsequent iteration. It is thus only when the proportion of the error values are unacceptable that the derivative, and its inverse, is re-calculated. Thus, for many of the iterations, requirement to re-calculate the derivative and its inverse is omitted. As a result, the iteration process can operate more rapidly than known methods, to achieve a more real-time solution.

Thus, the present invention may provide a method of determining the positions and orientations of the base and platform of a parallel manipulator, using an iterative calculation in which successive iterations calculate estimates of said positions and orientations, each estimate being determined from the previous estimate using an inverse of a derivative of an error function, that function also being used to determine error values for each estimate, wherein:

when, for one of said iterations, at least one of a) the absolute magnitude of said error values are less than a predetermined maximum, b) the RMS of said error values is less than a further predetermined maximum, and c) the error convergence rate is less than a predetermined value, the subsequent one of said iteration uses unchanged said inverse of said derivative of said function; and when for said one of said iterations, at least one of a) the absolute magnitude of said error values is greater or equal to a predetermined maximum, b) the RMS of said error values is greater than or equal to said further predetermined maximum and c) said error convergence rate is greater than or equal to said predetermined value, a revised inverse of said derivative of said function is calculated, using the estimate of position and orientation calculated in said one of said iterations, and said revised inverse is used instead of said inverse in the subsequent one of said iterations.

Preferably, an initial estimate of the position and orientations is used to determine initial error values. The inverse of the derivative of the error function is then applied to that initial estimate of position and orientation, to get a refined estimate of the solution, which is used in the next iteration, thereby to direct the calculation towards a solution. Since the platform has six degrees of freedom relative to the base, the derivative is normally a 6×6 matrix, also known as a Jacobian matrix.

As mentioned above, the values used to determine whether or not the derivative is to be recalculated are based on error values for each estimate. Preferably, the error values represent the difference between said link lengths and the calculated link lengths based on the estimate of the position and orientation of the platform relative to base.

At each iteration, it is determined whether the errors have an absolute value (modular value) less than a predetermined maximum and/or have an RMS value less than a predetermined maximum, or have an error convergence rate less than a predetermined value. If the error values are greater than their respective maxima, or the error convergence rate is greater than or equal to the predetermined value, then a new derivative and its inverse must be calculated. If only one or two of the above criteria are met, then it is optional as to whether to re-calculate the derivative or not, that option being determined by balancing the required accuracy of the solution with processing requirements. If maximum values are not exceeded, or the error convergence rate is less than a predetermined value, the derivative can be re-used unchanged in the next iteration.

It is preferable that the error convergence rate is determined by calculating the ratio of the absolute magnitude of an error value, to the absolute magnitude of the previous error value. For clarification, the absolute magnitude of an error value may be determined by taking the modulus of the error value. The predetermined value for assessing the convergence rate is preferably 1 or less, more preferably is the range 0.3 to 0.9

Once the error values are sufficiently small, iteration can be stopped. Hence, the position of the platform relative to the base is known to a sufficient level of accuracy, for the application to which the Stewart-Gough platform is applied, and further iterations become unnecessary. Thus, with the present invention, position and orientation of the platform of a Generalised Stewart Platform, relative to the base can be determined quickly, using an iterative method in which some calculations are carried out in only some of the iteration steps, and in others, values calculated in a previous iteration are re-used. The result is a simplified numerical method, which enables the position and orientation to be determined quickly, using available processing equipment.

BRIEF DESCRIPTION OF THE DRAWINGS

An embodiment of the invention will now be described by way of example only, with reference to the accompanying figures, in which.

DETAILED DESCRIPTION; FURTHER OPTIONS AND PREFERENCES

The present invention can be applied to the rapid solution of the forward, or direct, kinematics of the Generalised Stewart Platform, also known as a hexapod. In particular, an embodiment of the current invention will be described as applied to a Taylor Spatial Frame (TSF), for example manufactured by Smith & Nephew Plc. However, it should be noted that the present invention could be applied to other systems based on Stewart Platforms, or six degree parallel manipulators/actuators e.g. 'shaking tables', flight simulators and relevant manufacturing systems.

Figure 1:
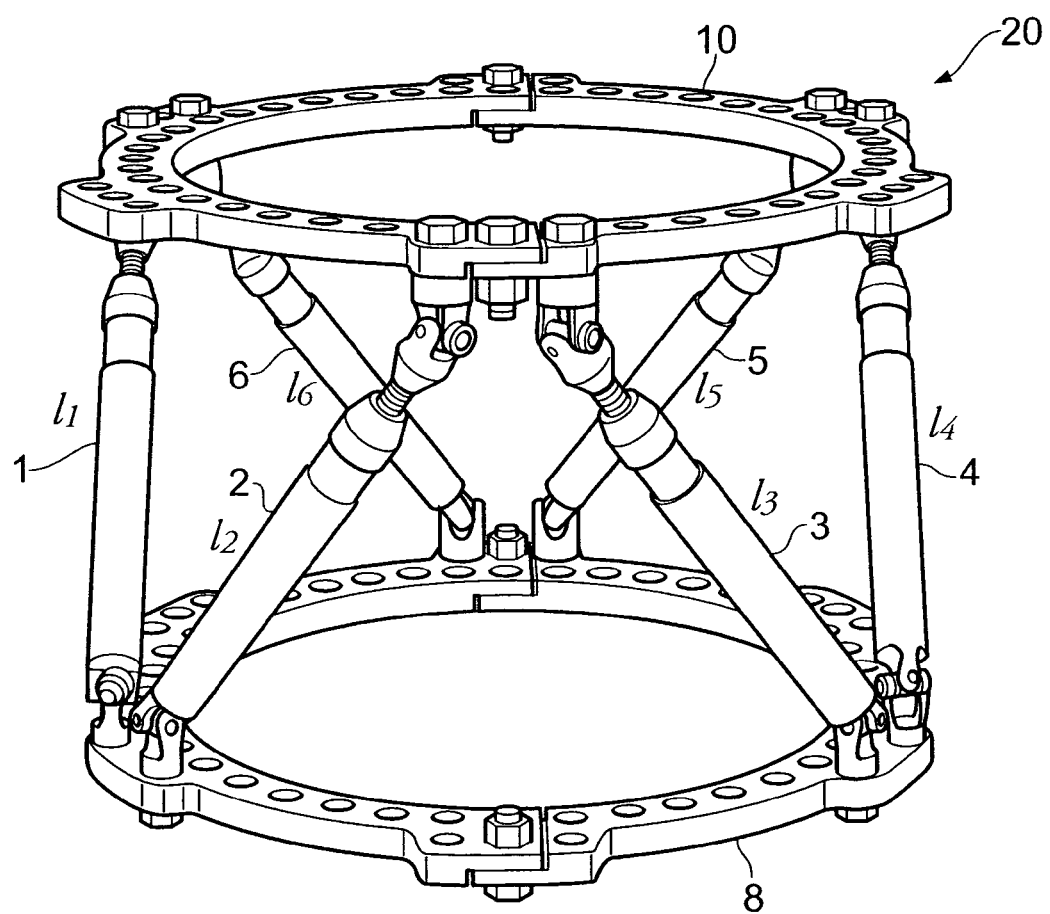
FIG. 1 shows a Taylor Spatial Frame.

FIG. 1 shows an embodiment of a TSF, having a base 8 and a platform 10, interconnected by six links, 1-6. The connections of the links to the platform and base do not necessarily have to be placed symmetrically. They can be placed arbitrarily, and they do not have to lie in plane. Actuators can vary the length $l_1$ to $l_6$ of each of the links 1 to 6, and the actuators may be controllable mechanically or electronically. Each of the links may be formed from a threaded rod, connected, for example, to the platform, and which is inserted into an appropriate tube, which is connected, therefore, to the base. An electric motor, or some other kinematic device, may be provided with a means for converting the rotary motion into a linear motion of the threaded rod, a pinion perhaps. However, the present invention could equally be applied to a GSP, or other parallel manipulator, whereby the length of the links can be varied by other means, such as pneumatic or hydraulic cylinders, telescopic extenders, or some other device effecting linear extension or contraction of a link length.

In the embodiment described here, the base and platform of the TSF are substantially circular, and are therefore sometimes referred to as rings. However, it is clear that the present invention can be used to determine the position of any shape of platform relative to any shape of base, or vice versa.

Although not illustrated, each of the links 1-6 may include a display for displaying the length of the link, for example an electronic display such as an LCD or a Vernier meter or the like. The links may include means for transmitting a data signal, which includes information about the length of the link, to an appropriate apparatus for receiving such a signal, for example a computer or other data processor. A central unit may be provided to transmit a data signal including information about the length of all the links, to the appropriate apparatus.

The links are connected to the base and platform at opposite ends, as shown in FIG. 1, such that one end of a link is connected to a first ring close to the point of connection on the first ring of a first near neighbour, and the other end of the link is connected to the second ring close to the point of connection of a second near neighbour to the second ring. In the TSF discussed in this embodiment the connection of each of the links to the base and platform is independent of the others. However, the present invention is equally applicable to a TSF, or indeed any parallel manipulator, having, for example, links that are connected to both the base and the platform.

The links are pivotally attached to the base and platform by universal joints, such as a ball and socket, a rotating pivot, or the like. In this way, the TSF provides a system having six-degrees of freedom (SDF).

In this embodiment, a left-handed Cartesian coordinate system is used, and as such the six degrees of freedom of the platform constitute translations along the x, y and z-axes, and rotations about these same axes. However, any other coordinate system can be used as well. Varying the length of the individual links causes movement of the platform relative to the base in these six degrees of freedom. It is clear that, depending on the application for which the TSF is to be used, then the position and orientation (or the desired position and orientation) of the platform relative to the base will be known and the length of the links required, or the length of the links will be known and the position and orientation of the platform relative to the base required.

The aim of inverse kinematics is to determine the length of the connecting links of a general GSP, when the location of the base and platform are known. It is a trivial problem that can be solved using vector algebra. However, forward, or direct, kinematics is tricky, because the equations of inverse kinematics are not directly invertible. Finding the platform location relative to the base, when the link lengths are known, is not trivial. It is known for a general GSP that up to 40 solutions may exist in complex space for a given set of links lengths. Therefore, a data processor, a computer for example, can be used to calculate both the forward and inverse kinematics. By using the link length data, the present embodiment can quickly determine a real solution to the position and orientation of the platform, relative to the base.

The position and orientation of the platform 10 relative to the base 8 can be defined by a transformation vector $\vec{t} = [\alpha, \beta, \gamma, t_x, t_y, t_z]$, where $\alpha$, $\beta$ and $\gamma$ represent rotations about the x, y, z axes of the Cartesian coordinate system, whose origin has a predetermined position relative to the base. Preferably the origin is aligned with the centre of the base. However, other positions are possible, provided the relationship between the coordinate system and the base is known. Moreover $t_x$, $t_y$, $t_z$, correspond to translations in the x, y, z directions of the Cartesian coordinate system in this order. In this embodiment, therefore, the transformation vector $\vec{t}$ is a 1×6 vector, corresponding to the 6 degrees of freedom of the system. However, any other order of transformations could be used instead.

$$pr_{6\times 4} = \begin{pmatrix} 0.0600 & -0.0180 & 0.0768 & 1.0000 \\ 0.0365 & -0.0180 & 0.0904 & 1.0000 \\ -0.0966 & -0.0180 & 0.0136 & 1.0000 \\ -0.0966 & -0.0180 & -0.0136 & 1.0000 \\ 0.0365 & -0.0180 & -0.0904 & 1.0000 \\ 0.0600 & -0.0180 & -0.0768 & 1.0000 \end{pmatrix}.$$

$T(\vec{t}_j)$ is a 4×4 transformation matrix based on the transformation vector $\vec{t}_j$. It is given by:

$$T(\alpha, \beta, \gamma, t_x, t_y, t_z) = \begin{pmatrix} \cos\beta \cdot \cos\gamma & \cos\beta \cdot \sin\gamma & -\sin\beta & 0 \\ \sin\alpha \cdot \sin\beta \cdot \cos\gamma - \cos\alpha \cdot \sin\gamma & \sin\alpha \cdot \sin\beta \cdot \cos\gamma + \cos\alpha \cdot \cos\gamma & \sin\alpha \cdot \sin\beta & 0 \\ \cos\alpha \cdot \sin\beta \cdot \cos\gamma + \sin\alpha \cdot \sin\gamma & \cos\alpha \cdot \sin\beta \cdot \sin\gamma - \sin\alpha \cdot \cos\gamma & \cos\alpha \cdot \cos\beta & 0 \\ t_x & t_y & t_z & 1 \end{pmatrix}$$

The lengths $l_1$ to $l_6$ of the links 1-6 of the TSF are known, and are represented by $\|l^*\|_{i,1}$ (in this embodiment a 6×1 matrix). A solution of the forward kinematics satisfies the equation, which is also an error function, $$F(t_j)_{6\times 1} = \|l^*\|_{6\times 1} - \|l(t_j)\|_{6\times 1} \Rightarrow 0_{6\times 1} \qquad 1$$

In this equation $\|l(t_j)\|_{i,1}$ represents an estimate of the link lengths based on an estimate of the transformation vector $\vec{t}$, and in this case is a 6×1 vector, where j is the identifying number of the current iteration.

Figure 2:
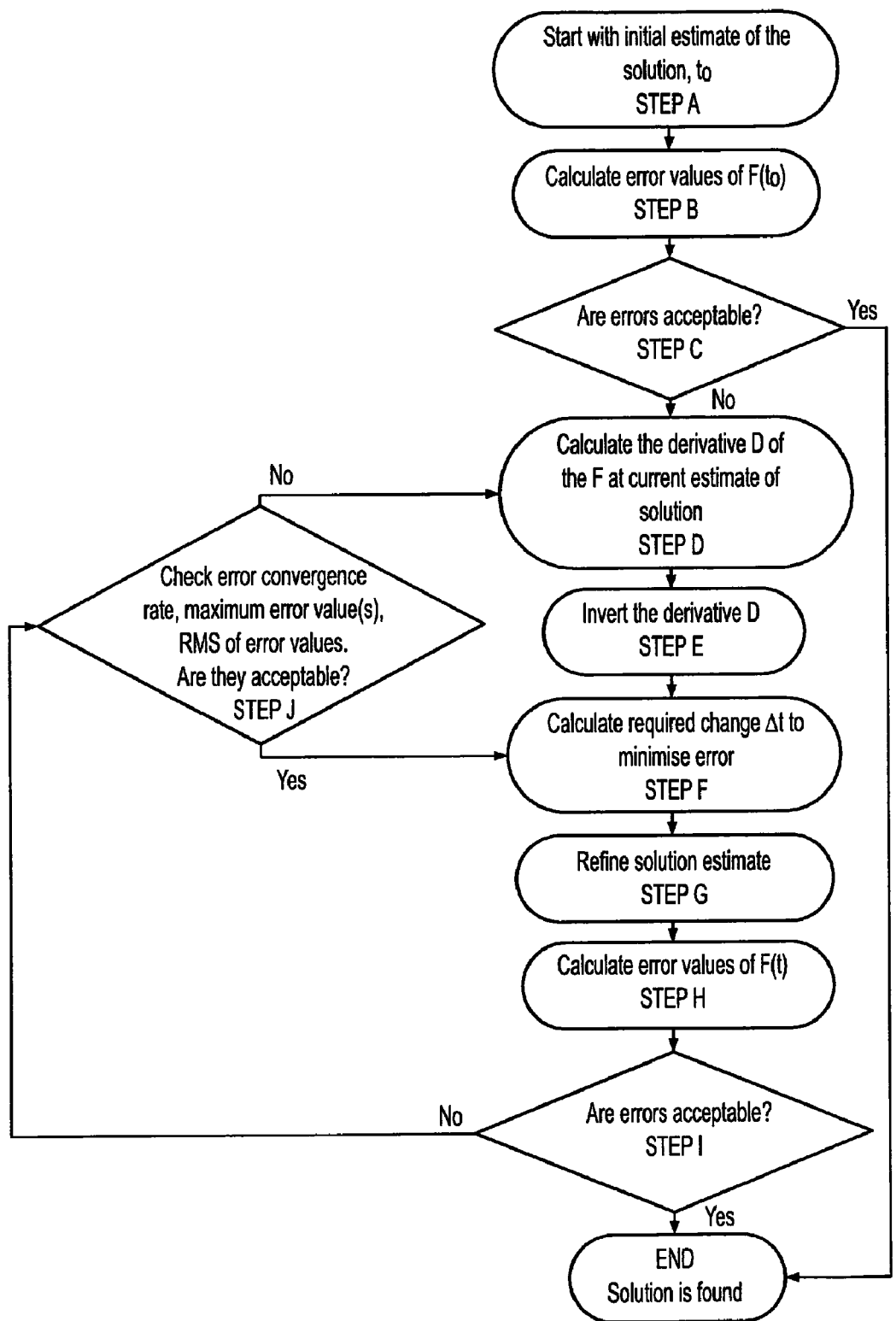
FIG. 2 shows a flowchart for the method of calculating a solution of the forward kinematics.

An initial estimate, $\vec{t}_0$, of the solution, could be defined as:

$$\vec{t}_0 = \left[ 0, 0, 0, 0, \frac{(\sum \|l^*\|_{i,1})}{6}, 0 \right] \qquad 2$$

and represents step A of FIG. 2 (of course, equation 2 represents only one possible initial estimate, any other estimate could be used). The length of each link 1 to 6 can then be calculated for the estimated solution t from the following equations:

$$P(\vec{t}_j)_{6\times 4} = pr_{6\times 4} \cdot T(\vec{t}_j)_{4\times 4} \qquad 3$$

$$l(\vec{t}_j)_{6\times 4} = P(\vec{t}_j)_{6\times 4} - dr_{6\times 4} \qquad 4$$

$$\|l(\vec{t}_j)\|_{i,1} = \sqrt{l(\vec{t}_j)_{i,1}^2 + l(\vec{t}_j)_{i,2}^2 + l(\vec{t}_j)_{i,3}^2} \text{ for } i = 1 \ldots 6 \qquad 5$$

Where dr is a geometry matrix defining connection points of the links on the base relative to the centre of the base. Each point occupies one row of the matrix and is of the form [x,y,z,1]; pr is a geometry matrix defining connection points of the links to the platform relative to the centre of the platform, and each point occupies one row of the matrix and is of the form [x,y,z,1].

The origins of the platform and base can clearly be located arbitrarily in space; however it is most convenient to locate them at the centres of the rings. The connection points can then be defined relative to the origins of the rings in vector form, forming two 6×4 matrices. A matrix for a TSF ring is presented below, by way of example only, where the coordinates are in meters, Of course, the matrix $T(\vec{t}_j)$ will be different for different coordinate systems.

Subsequently, at step B, the error values, $F(\vec{t}_0)$, for the estimated solution are calculated by use of equation (1).

At step C the error absolute values $F(\vec{t}_j)$ are compared with predetermined, acceptable error values. If the error values are found to be acceptable, then the solution $\vec{t}_0$ of the transformation vector $\vec{t}$ is deemed to be acceptable and the computation stops. If, however, the errors are deemed unacceptable, then step D is executed.

At step D the derivative D of the function F is calculated at the estimated solution $\vec{t}_j$; in this particular embodiment the derivative is a 6×6 Jacobian matrix, as shown below, $$D(\vec{t}_j) = \frac{dF(\vec{t}_j)_{6\times 4}}{dt}$$

$$= \begin{pmatrix} \frac{\partial F(t_j)_{1,:}}{\partial \alpha} & \frac{\partial F(t_j)_{1,:}}{\partial \beta} & \frac{\partial F(t_j)_{1,:}}{\partial \gamma} & \frac{\partial F(t_j)_{1,:}}{\partial t_x} & \frac{\partial F(t_j)_{1,:}}{\partial t_y} & \frac{\partial F(t_j)_{1,:}}{\partial t_z} \\ \frac{\partial F(t_j)_{2,:}}{\partial \alpha} & \frac{\partial F(t_j)_{2,:}}{\partial \beta} & \frac{\partial F(t_j)_{2,:}}{\partial \gamma} & \frac{\partial F(t_j)_{2,:}}{\partial t_x} & \frac{\partial F(t_j)_{2,:}}{\partial t_y} & \frac{\partial F(t_j)_{2,:}}{\partial t_z} \\ \frac{\partial F(t_j)_{3,:}}{\partial \alpha} & \frac{\partial F(t_j)_{3,:}}{\partial \beta} & \frac{\partial F(t_j)_{3,:}}{\partial \gamma} & \frac{\partial F(t_j)_{3,:}}{\partial t_x} & \frac{\partial F(t_j)_{3,:}}{\partial t_y} & \frac{\partial F(t_j)_{3,:}}{\partial t_z} \\ \frac{\partial F(t_j)_{4,:}}{\partial \alpha} & \frac{\partial F(t_j)_{4,:}}{\partial \beta} & \frac{\partial F(t_j)_{4,:}}{\partial \gamma} & \frac{\partial F(t_j)_{4,:}}{\partial t_x} & \frac{\partial F(t_j)_{4,:}}{\partial t_y} & \frac{\partial F(t_j)_{4,:}}{\partial t_z} \\ \frac{\partial F(t_j)_{5,:}}{\partial \alpha} & \frac{\partial F(t_j)_{5,:}}{\partial \beta} & \frac{\partial F(t_j)_{5,:}}{\partial \gamma} & \frac{\partial F(t_j)_{5,:}}{\partial t_x} & \frac{\partial F(t_j)_{5,:}}{\partial t_y} & \frac{\partial F(t_j)_{5,:}}{\partial t_z} \\ \frac{\partial F(t_j)_{6,:}}{\partial \alpha} & \frac{\partial F(t_j)_{6,:}}{\partial \beta} & \frac{\partial F(t_j)_{6,:}}{\partial \gamma} & \frac{\partial F(t_j)_{6,:}}{\partial t_x} & \frac{\partial F(t_j)_{6,:}}{\partial t_y} & \frac{\partial F(t_j)_{6,:}}{\partial t_z} \end{pmatrix}$$

Again, if a different sequence of transformations is defined, a different derivative matrix $D(\vec{t}_j)$ has to be derived based on the Jacobian matrix. Specific elements of the matrix $D(\vec{t}_j)$, represented in equation above, can be found using equation 6 for columns 1-3 and using equation 7 for columns 4-6:

$$D(\vec{t}_j)_{r,c} = -\frac{1}{|l(t_j)|_{r,1}} \begin{pmatrix} l_{r,1} \cdot \left( pr_{r,1:4} \frac{\partial T(t_j)}{\partial t_c} \right)_1 + \\ l_{r,2} \left( pr_{r,1:4} \frac{\partial T(t_j)}{\partial t_c} \right)_2 + \\ l_{r,3} \left( pr_{r,1:4} \frac{\partial T(t_j)}{\partial t_c} \right)_3 \end{pmatrix} \quad 6$$

$$D(t_j)_{r,c} = -\frac{1}{|l(t_j)|_{r,1}} (l_{r,c-3}) \quad 7$$

At step E the inverse, $D^{-1}(\vec{t}_j)$, of $D(\vec{t}_j)$ is calculated.

Calculations are performed at Step F to determine the required change $\Delta \vec{t}_j$ to reduce the error values derived from equation 1 by refining the solution $\vec{t}_j$. In this embodiment, the calculation involves multiplying the inverse derivative $D^{-1}(\vec{t}_j)$ with the original $F(\vec{t}_j)$ error function to find $\Delta \vec{t}_j$:

$$\Delta \vec{t}_j = D^{-1}(\vec{t}_j) \cdot F(\vec{t}_j) \quad 8$$

In step G a refined estimated solution, for example $\vec{t}_{j+1}$, is calculated by the addition of $\Delta \vec{t}_j$ to the original solution $\vec{t}_j$ as below:

$$\vec{t}_{j+1} = \vec{t}_j + \Delta \vec{t}_j \quad 9$$

In step H, the error values of the function $F(\vec{t}_{j+1})$ are calculated, again by use of equation 1. The calculated errors are compared with predefined acceptable errors in step I. If the errors are deemed acceptable, then the end solution is found, and the computation is stopped.

If, however, the calculated errors are unacceptable then step J is executed, whereby if the convergence rate of the error values is acceptable, or the maximum error values are acceptable, or the RMS error values are acceptable, then step F is executed again, calculating the required refinement to the subsequent estimate, $\vec{t}_{j+1}$, to reduce the error by using equation 8, $$\Delta \vec{t}_{j+1} = D^{-1}(\vec{t}_j) \cdot F(\vec{t}_{j+1})$$

The convergence rate referred to in this embodiment is defined as being the ratio of the absolute magnitude of the current error value to the absolute magnitude of the previous absolute error value.

In the present embodiment, if one of the errors at step J is not acceptable then steps D and E are executed, however, it should be obvious that more than one of the errors may be required to be acceptable if steps D and E are not to be executed.

The method of calculation of a new refinement of the estimate solution, does not require the re-calculation of an inverse derivative, $D^{-1}$, of the function F. Therefore, the most computer intensive operations at steps D and E are not repeated.

The refined solution estimate, say $\vec{t}_{j+2}$, is calculated using equation 9, in step G;

$$\vec{t}_{j+2} = \vec{t}_{j+1} + \Delta \vec{t}_{j+1}$$

The method is then performed as previously described, from step H onwards.

If however, at step J, the convergence rate of the error values is not acceptable, or the maximum error values are not acceptable, or the RMS error values are not acceptable, then step D is executed again. The derivative D of function F is recalculated at the contemporary estimated solution $\vec{t}_{j+1}$. The process then executes step E and continues to flow as described until the errors are deemed acceptable in step I and a solution in the form of transformation vector, is found. However, it should be obvious to a person skilled in the art that although this description is limited to a small number of iterations, the invention is not so limited.

Therefore, the most computationally intense, and therefore time consuming, operation of calculating the derivative $D(\vec{t}_j)$ and inverse of the function $F(\vec{t}_j)$ is performed far less frequently. Therefore, the transformation vector solution $\vec{t}_j$ is calculated and the position and orientation of the platform 10 is found relative to the base 8, from the lengths of the six legs 1-6 by a more rapid and less computationally intense method.

The invention claimed is:

1. A method of determining the positions and orientations of the base and platform of a parallel manipulator, using an iterative calculation in which successive iterations calculate estimates of said positions and orientations, each estimate being determined from the previous estimate using an inverse of a derivative of an error function, that function also being used to determine error values for each estimate, wherein:

when, for one of said iterations, at least one of a) the absolute magnitude of said error values are less than a predetermined maximum, b) the RMS of said error values is less than a further predetermined maximum, and c) the error convergence rate is less than a predetermined value, the subsequent one of said iteration uses unchanged said inverse of said derivative of said function; and when for said one of said iterations, at least one of a) the absolute magnitude of said error values is greater or equal to said predetermined maximum, b) the RMS of said error values is greater than or equal to said further predetermined maximum and c) said error convergence rate is greater or equal to said predetermined value, a revised inverse of said derivative of said function is calculated, using the estimate of positions and orientations determined in said one of said iterations, and said revised inverse is used instead of said inverse in the subsequent one of said iterations.

2. The method of claim 1 wherein said calculation of said estimates of said positions and orientations includes calculating a transformation vector representing said position and orientations.

3. The method of claim 1, wherein said base and platform are connected by a plurality of links, the length of which is known, and said estimates of said position and orientations are calculated from said known lengths.

4. The method of claim 3, wherein said error values for each said iteration are derived by:

deriving from said estimate of said position and orientation, estimated lengths of said links corresponding to said estimate of said position and orientation; and comparing said estimated lengths with said known lengths.

5. The method of claim 4 wherein said function is a relationship between said known lengths and said estimated lengths.

6. The method of claim 5, wherein for a first iteration, said estimated lengths are predetermined.

7. The method of claim 1, wherein said derivative is a Jacobian matrix of said function.

* * * * *